United States Patent [19]
Lawson

[11] 4,283,130
[45] Aug. 11, 1981

[54] SEQUENCING CAMERA

[76] Inventor: John R. Lawson, 277 Baker Ave., West Concord, Mass. 01781

[21] Appl. No.: 119,819

[22] Filed: Feb. 8, 1980

[51] Int. Cl.³ .............................................. G03B 1/00
[52] U.S. Cl. ................................................... 354/120
[58] Field of Search ............................... 354/120–125, 354/150

[56] References Cited

U.S. PATENT DOCUMENTS

| | | | |
|---|---|---|---|
| 3,984,850 | 10/1976 | Bley | 354/125 |
| 4,103,310 | 7/1978 | Yasillo | 354/120 |

Primary Examiner—John Gonzales
Attorney, Agent, or Firm—James H. Grover

[57] ABSTRACT

A camera for taking a plurality of photographic images utilizing a single focal plane, usually a plate or a sheet of film, which is fixedly disposed with relation to the lens. The camera is divided into a plurality of focal locations arranged about a rotatable mirror associated with the lens and one or more additional mirrors which reflect an image from the rotatable mirror to a portion of the plane. The camera is capable of taking a succession of pictures and displaying them in a tightly packed, rectangular and non-overlapping array around the perimeter of the focal plane. The image beam from the lens is directed at each successive focal location by the rotatable mirror and the additional mirror which reflect the beam to image at the focal plane. To obtain the desired arrangements of the plurality of images on the fixedly disposed focal plane, the image centers are disposed at different length radii from the lens and rotating mirror axis. The maintenance of the focus on the single plane is accomplished with the additional mirror which is varied in height from the focal plane such that the optical distance from the lens to each image is substantially constant. Therefore in addition to the rotation of the axis of the first mirror, an orthogonal axis is required to tilt the first mirror towards the variable height of the other mirror and thereby maintain focus on the common focal plane. This construction will permit formation of a plurality of closely packed images in a rectangular array on the common focal plane without relative movement of the lens or the focal plane.

17 Claims, 8 Drawing Figures

SEQUENCING CAMERA

BACKGROUND OF THE INVENTION

(1) Field of the Invention

This invention relates to sequencing cameras, and more particularly to camera mechanisms which permit a plurality of images to be sequentially photographed on a single focal plane in a tightly packed non-overlapping, rectangular array.

(2) Prior Art

Multiple image sequentially operated single film plate cameras are necessary to efficiently make photographic images of gamma radiography including x-rays or cathode ray display tubes. Attempts at providing multiple image cameras are shown in U.S. Pat. Nos. 3,984,850 to Bley and 4,103,310 to Yasillo. The patent to Bley shows a sequence camera having a base shifting assembly which rotates to four different positions permitting four exposures in a single sheet of film. The patent to Yasillo discloses another multiple image camera wherein a mirror rotates to place a focused image at four different locations on a single film. The prior art cameras are limited to circular patterns of photographic images because they are incapable of taking photos of images wherein the radius of the image centers from the lens' optical axis differs from one another. That is they do not have the ability to automatically vary the radial distance to the image centers and adjust their respective optical devices to maintain constant the focal lengths for each of the images. In cameras that take closely packed arrays of photos, the film is shifted from location to location while the lens is maintained in one stationary position.

It is desirable to have a plurality of closely packed images and especially more than four images produced on a single sheet of film in an array more tightly packed and readable than permitted with a circular array, for example. Such arrays use less film or alternatively, larger images can be produced. In one aspect of the invention, it is also desirable to have identifying indicia simultaneously exposed on the same single sheet of film while not obstructing images of the subject thereon. The images and indicia are needed particularly in x-ray photography where a patient may need to be moved to take quite a few x-rays at different angles and wherein the x-ray photographs may be conveniently studied on a single developed photographic plate having the patient's name and vital information printed thereon.

It is thus an object of the present invention to provide a multiple image camera wherein a closely packed array of exposures can be produced around the perimeter of a single sheet of film in a rightly packed, side-by-side array.

A further object of the present invention is to provide a camera which can simultaneously record printed information of the subject on the same sheet of film as the multiple exposures.

Yet a further object of the present invention is to provide a camera capable of taking multiple images on a single sheet of film in a fixed position relative to the lens while maintaining constant the position relationship between the lens and the single focal plane and assemblage of successive images on that plane.

BRIEF SUMMARY OF THE INVENTION

The present invention comprises a camera for forming an array of images on a single focal plane and includes a lens arrangement adapted to receive light and direct it into a focal light path in the camera. A moveable mirror is arranged to rotate and pivot and is disposed in the focal light path of the lens. At least one additional mirror is mounted in communication with the moveable mirror and arranged to direct light to an individual location on the focal plane. A mechanism is utilized to rotate the moveable mirror in a sequence about the focal light path whereby light from the lens will be sequentially redirected to the additional mirror. The focal light path is regulated by disposition of the additional mirror to accommodate variations in the position of the additional mirror to maintain a substantially constant optical light distance between the lens and each location sequentially on the focal plane.

In the preferred embodiment, the camera comprises a plurality of independent chambers arranged around the perimeter of the focal plane and having corner chambers and other chambers intermediate the corner chambers. Each chamber is open at one end to the sheet of film and a reflecting mirror is disposed at the other end of each chamber. A lens is arranged in a cylindrical housing in the camera opposite the film and a moveable mirror is mounted within the camera between the lens and its focal plane. The moveable mirror is arranged to rotate in a support member to reflect images coming through the lens, sequentially into the chambers of the camera at the respective mirrors therein and onto the film for sequential exposure thereof. Since the camera has the capabilities for exposing more than four portions of the film sheet, some of the mirrors in the respective corner chambers will of necessity be at a greater distance from the focal point on the moveable mirror and are therefore arranged closer to the film than the intermediate chamber mirrors thereby permitting all focal light path lens for all chambers, whether corner or intermediate, to remain constant.

While the use of chambers is preferred to prevent light scatter from one space to another on the film sheet, it is also possible to mount a single chamber on the support member and dispose a single additional mirror within that chamber and rotate the chamber with the support about the axis of the lens. The additional mirror is linked to the moveable mirror and arranged in tandem to pivot about and rotate on a radius of the optical axis of the lens so as to maintain substantially identical optical length between the lens and the focal plane at each location thereof. Although requiring precise definition of the perimeter of the image entering the lens, it has also been found that the incoming light can be precisely regulated so that upon redirection through the rotating mirror and the additional mirror, it may be focused directly upon the focal plane without the necessity of using a rotating chamber disposed upon the support member. When the perimeter of the incoming image is not as precisely defined in that way, it may be desirable to dispose a mask upon the focal plane and shuttle an aperture in the mask through the same sequential arrangement as the moveable mirror thereby exposing sequential locations on the focal plane.

The moveable mirror is preferably arranged to pivot by a cam and cam follower mechanism set up with the lens housing to permit the moveable mirror to properly pivot to reflect images received from the lens to the chamber mirrors on the corner of the camera which are further from the rotating mirror and arranged compensatingly closer to the film as well as to rotate sequentially and pivot so as to reflect the images received from the lens to the mirrors in chambers intermediate any corner chambers, which mirrors being closer to the moveable mirror would be arranged further from the film than the corner mirrors. The moveable mirror may be rotated by motive means as it sequentially exposes the sheet film and when a geneva mechanism is utilized it is also biased to hold the cam follower against the cam surface as it rotates adjacent the lens housing. In a further embodiment of the invention, when chambers are utilized, an inner chamber is arranged within the camera to reflect and expose images from a data sheet onto a central portion of the film sheet.

BRIEF DESCRIPTION OF THE DRAWINGS

The objects and advantages of the present invention will become more apparent when viewed in conjunction with the following drawings in which.

DESCRIPTION OF THE PREFERRED EMBODIMENTS

Figure 1:
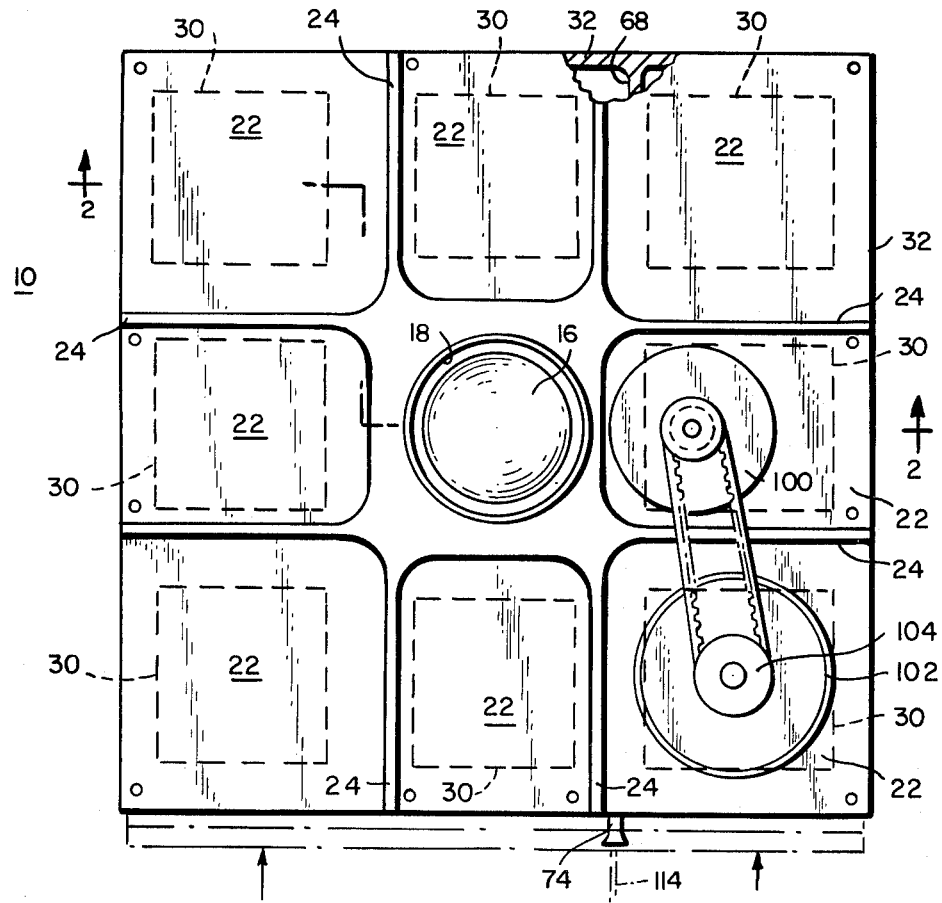
FIG. 1 is a plan view of the lens end of a camera constructed according to the principles of the present invention.
Figure 2:
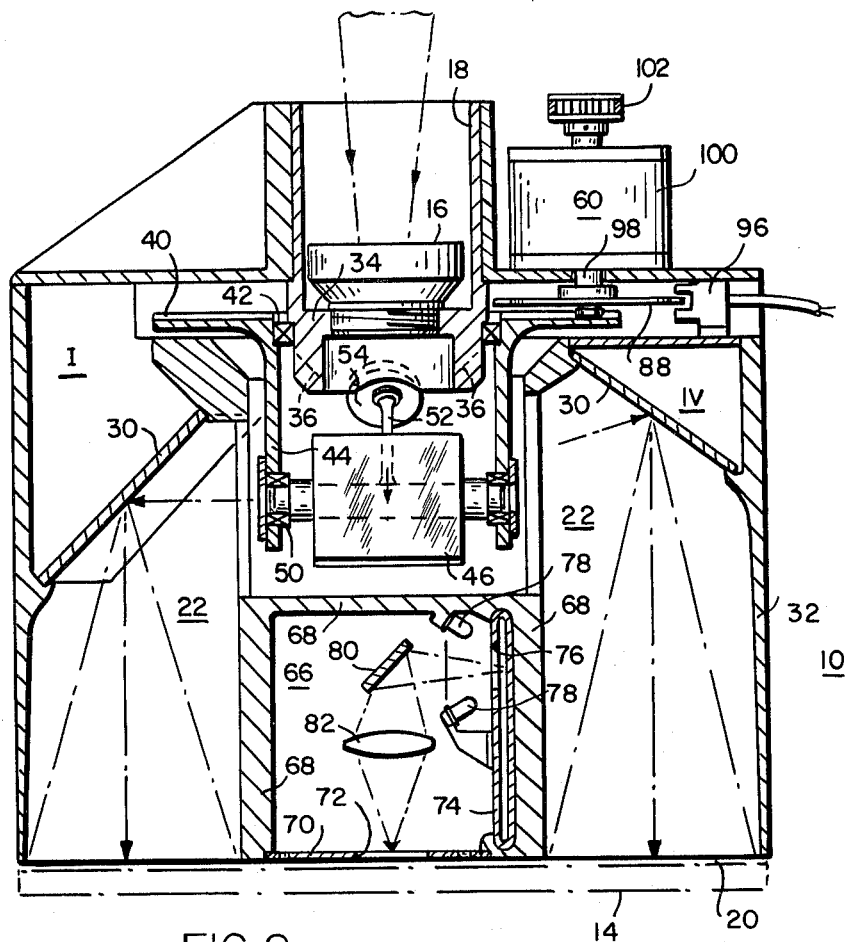
FIG. 2 is a view taken along the lines II—II of FIG. 1.

Referring now to the drawings in detail, and particularly to FIGS. 1 and 2, there is shown in plan and sectional views a multiple-image sequence camera 10. The camera 10 has an image receiving end 12 and a film exposing end 14, shown in FIG. 2. The image receiving end 12 includes a lens 16 and shutter mechanism arranged in a cylindrical housing 18 adapted to receive and regulate light entering therein. The film exposing end 14 of the camera 10 is open to permit a sheet or plate of film 20 to be secured there adjacent by standard means.

Figure 3:
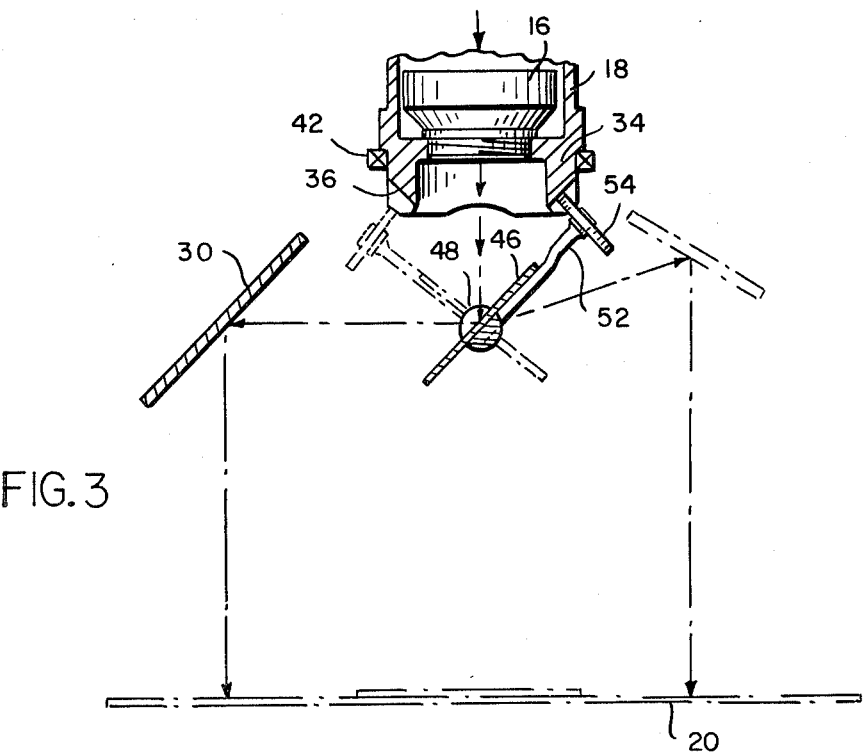
FIG. 3 is a partial sectional view of the lens and mirror arrangement.
Figure 4:
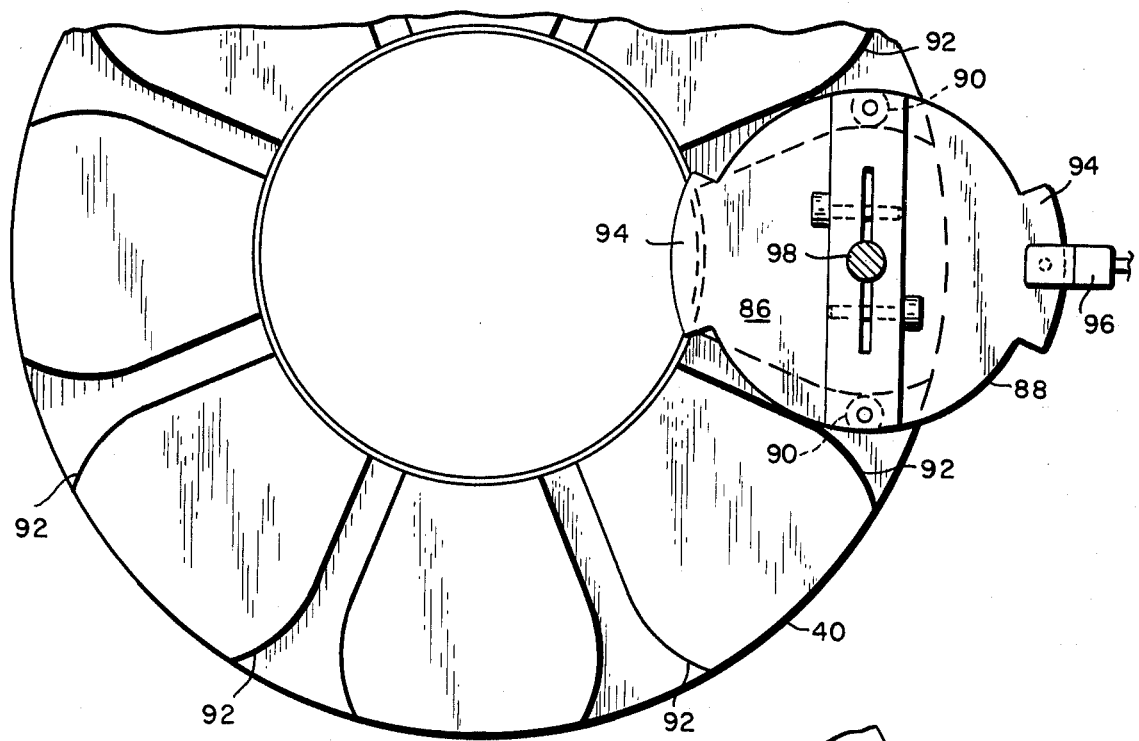
FIG. 4 is a plan view of a portion of a drive mechanism in its rest position effective for rotating the moveable mirror.
Figure 5:
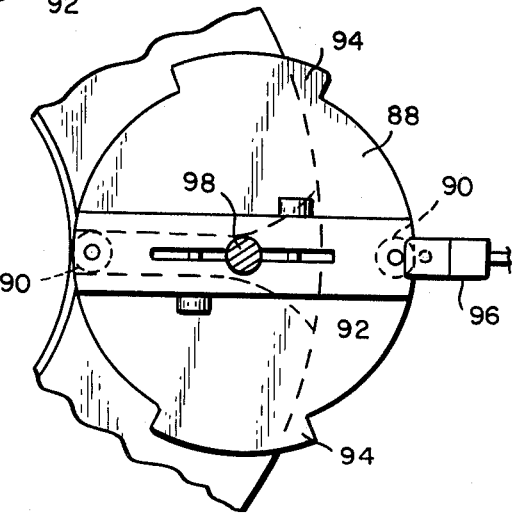
FIG. 5 is an enlarged view of a portion of FIG. 4 shown in mid-index motion.

The camera 10 is divided up into a plurality of photographic chambers 22. In this embodiment there are eight photographic chambers 22 arranged around the periphery of the camera 10, each open against the film 20 at the film exposing end 14 of the camera 10. They are separated from one another by an arrangement of septums or opaque partitions 24 which also provide reinforcement for the cylindrical housing 18. There are four corner chambers 22, and there may be a chamber arranged intermediate the corner chamber 22. Each chamber 22 has a mirror 30 securely arranged at its closed end adapted to reflect light to the film 20. The entire camera 10 is defined by an outer enclosure 32. The cylindrical housing 18 surrounding the lens 16 is secured within the enclosure 32. The cylindrical housing 18 has an inner end 34 which comprises a cam surface 36 which is shown in FIGS. 2 and 3. A wheel 40 is rotatively supported about the inner end 34 of the cylindrical housing 18 on an arrangement of bearings 42. A cylindrical hub 44 extends inwardly in the camera 10 from the rotatable wheel 40. A moveable mirror 46 is disposed on an axis 48 arranged normal to the incoming light path from the lens 16. The moveable mirror 46 is arranged to pivot on that axis 48 across the distal end of the cylindrical hub 44. The axis 48 has an arrangement of bearings 50 which adapt it to the hub 44. The axis 48 has an arm 52 extending generally normal thereto. The distal end of the arm 52 has a cam follower wheel 54 rotatively secured thereon. The cam follower wheel 54 is in rotative engagement with the cam surface 36. A motive device 60 is secured to and extends through the outer enclosure 32 to engage the wheel 40 to impart regulatable intermittent rotative motion thereto as well as to the hub 44 and the moveable mirror 46.

An inner chamber 66 is arranged at the film exposing end 14 of the camera 10 adjacent the film 20, and intermediate all of the photographic chambers 22, as shown in FIG. 2. The inner chamber 66 is enclosed by an arrangement of partitions 68 which are continuations of the septums 24. A mask 70 is disposed adjacent the film 20 in the inner chamber 66. A plurality of numbers are cut through the mask 70 and are arranged close to the particular chambers 22 which they identify. A central opening 72 is cut in the mask 70. A sheath 74 is secured to and is disposed along one of the partitions 68 and extends through the outer enclosure 32. The sheath 74 has a window 76 opening into the chamber 66. An arrangement of lights 78 are directed towards the window 76. A fixed mirror 80 is securely angled in the chamber 66, and a lens 82 is supported between the fixed mirror 80 and the opening 72 in the mask 70.

The rotatable wheel 40 is shown in FIGS. 2, 4, 5 and 6. In one embodiment, the rotative wheel 40 may comprise a star wheel as part of a geneva mechanism 86. In this particular mechanism, a drive wheel 88 is arranged adjacent the rotatable wheel 40. The drive wheel 88 has a pair of roller bearing cam followers 90 which are 180° apart from one another and which depend from one side thereof. The cam followers 90 each mate with a radially directed cam groove 92 on the rotatable star wheel 40. The drive wheel 88 also has a pair of tabs 94 that extend off of opposite peripheral portions thereof. A sensing device 96, such as a bifurcated pickup on a photo interrupter mechanism, is arranged at the perimeter of the drive wheel 88 so that the tabs 94 may pass intermediate the bifurcation thereof. The sensing device 96 may be connected through a proper feedback circuit to appropriate controls, not shown, to regulate sequential advancement of the moveable mirror 46 of the camera 10. The drive wheel 88 is mounted on a drive shaft 98. The drive shaft 98 may be adapted to a clutch and brake device 100, which itself may be run by a motor, 102, shown in FIG. 1, connected through a proper interconnecting system 104 such as a drive belt and pulley mechanism or a chain drive.

In an alternative form, the motive device 60, may comprise a stepping motor connected to a spur gear instead of a drive wheel 88 with cam followers 90. The spur gear could be engaged with an internal gear arrangement in place of the star wheel 40. The drive wheel could be adapted with spokes or timing tabs extending therefrom to actuate a sensing device 96 therewith.

Figure 6:
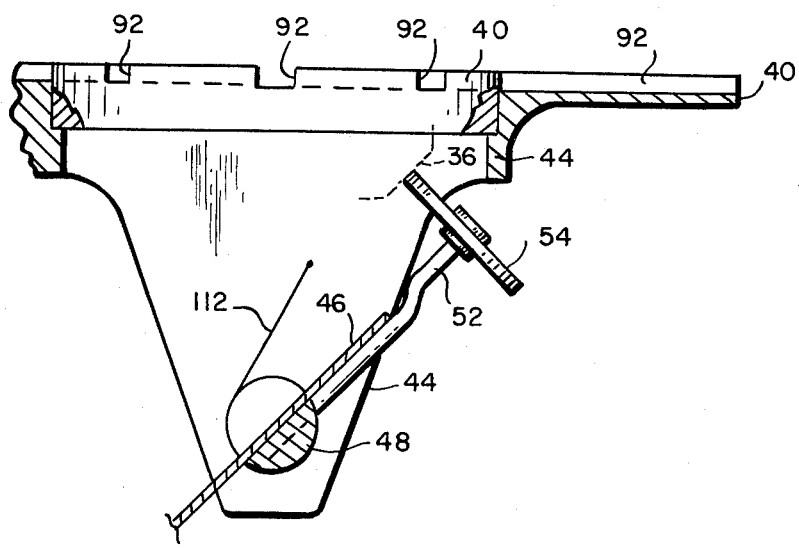
FIG. 6 is an enlarged view of the moveable mirror arrangement.

A sideview of a part of the rotatable wheel 40 and its depending hub 44, is shown in FIG. 6. The follower wheel 54 is held against the undulations of the cam surface 36 on the housing 18 by a biasing means 112, which may be a spring or the like, arranged between the axis 48 of the mirror 46 and the hub 44.

Figure 7:
FIG. 7 is a view of a film sheet arranged for the present invention.

The film 20 is shown in FIG. 7 wherein the demarcations between adjacent chamber portions thereof are indicated by dashed lines 110. An indicia means 114, as shown in FIG. 8, which may comprise an elongated card with pertinent information printed appropriately thereon, i.e. a patient's name and medical data.

Figure 8:
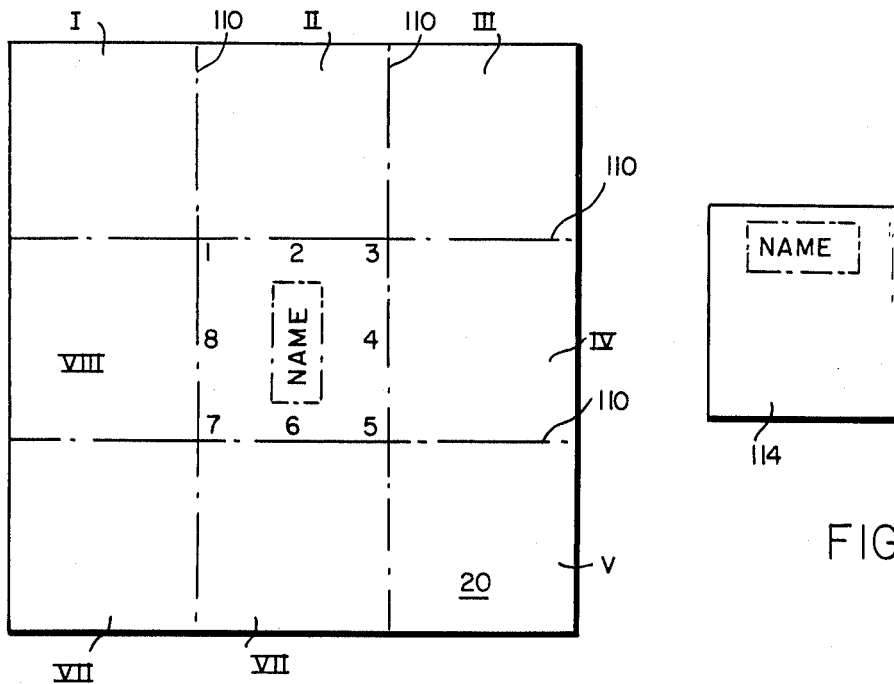
FIG. 8 is a view of a data sheet for insertion into the camera prior to use thereof.

In operation of the camera 10, the indicia means 114, shown in FIG. 8, is inserted into the sheath 74, shown in FIGS. 1 and 2. The information thereon may be displayed through the window 76 in the sheath 74. The film 20 is inserted in the appropriate slot at the film exposing end 14 of the camera 10. The patient, or object to be studied, not shown, is properly set-up and the lens 16 is focused. The lights 78 in the inner chamber 66 are flashed, by a proper control circuit, not shown, onto the data which is received through the window 76 on the sheath 74, reflected on the fixed mirror 80, focused through the lens 82, sent through the central opening 72 in the mask 70, and finally exposed on the film threadjacent.

The camera 10, after the aforementioned tasks are complete, is ready for utilization. The rotatable mirror 46 may begin reflecting light images to that portion of the film 20 which is designated for this example, as the corner chamber I shown in FIG. 7. Since each of the fixed mirrors 30 in the corner chambers (I, III, V and VII) are mounted a further distance away from the rotatable mirror 46 than each of the mirrors 30 in the intermediate chambers 22 herein numbered II, IV, VI, or VIII, the mirrors 30 in each corner chamber 22 must be arranged closer to the film 20 and focused at a different angle with respect to the film 20 than the intermediate mirrors 30, thus compensating one another to permit a single length constant focal light path from the lens to each portion of the film 20 for all the chambers 22. The rotatable mirror 46, must be pivoted to reflect incoming light from the lens 16 to the mirrors 30 which are arranged at alternating distances from the film 20, to accommodate the different focal paths yet maintain them all at a constant length. The mirrors 30 in the corner chambers 22, numbers I, III, V and VII may be disposed at about 45° with respect to the film 20, and the mirrors 30 in the other chambers 22, the intermediately numbered chambers II, IV, VI and VIII in this example may be inclined at about 35° with respect to the film 20, as shown in FIG. 3.

When successive exposures are desired, the appropriate controls, not shown, may be actuated to cause the motive device 60 to rotate. Rotation of the motive device 60 causes the rotatable wheel 40 and the depending hub 44 to rotate. Rotation of the motive device 60 causes the rotatable wheel 40 and the depending hub 44 to rotate. The intermittent rotative nature of the geneva mechanism 86, or the like, may be controlled by the sensing device 96. As the hub 44 intermittently rotates, the rotatable mirror 46, which is biasedly arranged therewith, rotates about the axis of the lens 16, that is, about the beam of incoming light, as well. The cam follower wheel 54, which is held by the biasing means 112 against the undulating cam surface 36, causes the rotatable mirror 46 to pivot towards and thereby align with and properly reflect the light image received from the lens 16 with each successive alternatively positioned mirror 30 in each successive chamber 22 from number I through number VIII as the camera 10 is sequentially actuated through a complete photographic cycle. Each undulation of the cam surface 36 is prearranged to permit the mirror 46 to pivot to the proper angle for proper reflective alignment with respect to the mirror 30 in the particular chamber 22 being utilized.

Thus there has been described an embodiment of a camera capable of sequentially exposing a plurality of portions of a single sheet of film, wherein angled reflective mirrors within chambers in the camera are arranged at alternating distances from the film therein to permit a single length of focal path light to be passed from the lens to the film in each chamber of the camera. A rotatable mirror pivotable to accommodate those variations of mirror angle and distance permits other than a circular array of exposures on that single sheet of film. There has also been shown an arrangement for encoding subject data on the same sheet of film as the multiple exposures.

It is intended that the appended claims are to be interpreted as exemplary only, and not in a limiting sense.

I claim:

1. A camera for focusing an array of images on a single focal plane at two or more radial distances from the optical axis of a focal light path, said camera comprising:
   a lens arrangement adapted to receive light and direct it into the focal light path in said camera;
   first mirror means arranged to rotate and tilt, said first mirror means being disposed in the focal light path from said lens; and
   second mirror means mounted in communication with said first mirror means and arranged to direct light from said first mirror means to at least two locations on said focal plane, said locations being displaced from each other in radial disposition from the optical axis of said lens; and
   means to maintain a constant focal length by tilting said first mirror means and disposing said second mirror means to accommodate variations in radial positioning of said array of images.

2. The camera according to claim 1 for focusing an array of images on a single focal plane at two or more radial distances from the optical axis of a focal light path wherein the means to maintain said constant focal length includes means to tilt said first mirror about an axis normal to the optical axis of said lens which permits the length of said focal light path between said lens and said focal plane to remain constant for each individual variation in radial location of an image on said focal plane.

3. A camera for forming a plurality of images around the perimeter of a common focal plane, said camera comprising:
   a lens arrangement adapted to receive light and direct it into a focal light path in said camera;
   a moveable mirror disposed in the focal light path from said lens;
   at least two additional mirrors disposed at different distances from the optical axis of the lens, said mirrors being arranged to direct light from said moveable mirror to individual exposure locations on said film;
   means to rotate said moveable mirror around the axis of said focal light path whereby light from said lens will be successively redirected to one of said mirrors; and means to maintain a constant focal length to accommodate variations in the positioning of said additional mirrors with respect to said incoming light.

4. A camera for forming a plurality of images on a single focal plane as recited in claim 3, wherein said means to maintain a constant focal length to accommodate variations in the positioning of said additional mirrors comprises means to tilt said moveable mirror about an axis normal to the optical axis of said focal light path from said lens, which permits the length of said focal light path between said lens and each of the individual exposure locations on said plane to remain constant.

5. A camera for forming a plurality of images on a single focal plane as recited in claim 3, wherein said means to rotate said moveable mirror comprises a motive device connected to said mirror for effecting intermittent actuatable rotative motion therein.

6. A camera for forming a plurality of images on a single focal plane as recited in claim 4, wherein said tilting means comprises cam follower attached to said moveable mirror, said cam follower being biasedly disposed against a cam surface.

7. A camera for forming a plurality of images on a single focal plane as recited in claim 6, wherein said cam surface comprises a portion of a housing about said lens, wherein rotation of said moveable mirror about the axis of said lens effects movement of said cam follower on said cam surface, providing a predeterminable pivotable motion of said moveable mirror.

8. A camera for forming a plurality of images on a single focal plane as recited in claim 6, wherein said camera comprises a plurality of chambers, and includes a plurality of mirrors each one of which is arranged in its own chamber.

9. A camera for forming a plurality of images on a single focal plane as recited in claim 8, wherein adjacent chambers may have their respective fixed mirrors arranged at varying distances from said film in said camera.

10. A camera for forming a plurality of images on a single focal plane as recited in claim 8, including an inner chamber having a wall portion thereof exposed to a portion of said film, said inner chamber also having data receiving and holding means.

11. A camera for forming a plurality of images on a single focal plane as recited in claim 9, wherein said inner chamber also comprises data transmitting means.

12. A camera for forming a plurality of images on a single focal plane as recited in claim 10, wherein said data receiving and holding means comprises a sheath.

13. A camera for forming a plurality of images on a single focal plane as recited in claim 11, wherein said data transmitting means comprises an arrangement of regulatable lights, a reflecting mirror and a focusing lens, permitting transmission of data from a card in said sheath to said mirror and through said lens, onto said film for exposure thereon.

14. A camera for sequentially forming a plurality of images on a focal plane comprising:
a lens arranged to receive and regulate light from outside of said camera;
a moveable mirror mounted on a hub, said moveable mirror being disposed on the optical axis of the lens;
a plurality of chambers arranged within the peripheral wall of said camera;
a fixed mirror arranged in each chamber to redirect light from said moveable mirror to a portion of said focal plane adjacent each of said particular chambers; and
means for tilting said moveable mirror at more than one angle to maintain constant the length of the focal light path between said lens and each location of film to be exposed.

15. A camera for sequentially forming a plurality of images on a single focal plane as recited in claim 14, wherein said means for tilting said mirror comprises a wheel connected to said hub, and intermittent driving means actuatable to simultaneously turn said wheel and hub.

16. A camera for forming a plurality of images on a single focal plane as recited in claim 15, wherein said means for tilting said mirror comprises:
an axis arranged normal to the optical axis of said lens for supporting said mirror on said hub; and a biased cam follower in mating engagement with a cam surface adjacent the periphery of said lens to effect tilting motion of said mirror about said normal axis simultaneous with any rotative motion of said moveable mirror, said tilting motion being effective to redirect light from said lens to said fixed mirrors, each of which may be individually arranged closer to or further from said film, thus maintaining the length of said focal light path constant.

17. A camera for sequentially forming a plurality of images on a single focal plane as recited in claim 15, wherein said intermittent driving means also comprises sensing device to effect successive intermittent motion of said moveable mirror and to effect exposure of portions of said film.

* * * * *